United States Patent [19]
Darby

[11] Patent Number: 5,185,664
[45] Date of Patent: Feb. 9, 1993

[54] METHOD AND APPARATUS FOR COMBINING FIELD AND FRAME RECURSIVE NOISE REDUCTION FOR VIDEO SIGNALS

[75] Inventor: Ted A. Darby, Knoxville, Tenn.

[73] Assignee: North American Philips Corporation, New York, N.Y.

[21] Appl. No.: 785,678

[22] Filed: Oct. 31, 1991

[51] Int. Cl.⁵ .............................................. H04N 5/21
[52] U.S. Cl. .................................... 358/167; 358/105
[58] Field of Search ...................... 358/167, 36, 105

[56] References Cited

U.S. PATENT DOCUMENTS

| | | | |
|---|---|---|---|
| 4,058,836 | 11/1977 | Drewery et al. | 358/167 |
| 4,296,436 | 10/1981 | Achiha | 358/167 |
| 4,361,853 | 11/1982 | Remy et al. | 358/167 |
| 4,387,364 | 6/1983 | Shirota | 340/347 |
| 4,390,894 | 6/1983 | Raven | 358/36 |
| 4,639,783 | 1/1987 | Fling | 358/166 |
| 4,652,907 | 3/1987 | Fling | 358/36 |
| 4,665,437 | 5/1987 | Nicholson | 358/148 |
| 4,847,682 | 7/1989 | Tsinberg et al. | 358/31 |
| 5,025,316 | 6/1991 | Darby | 358/167 |
| 5,119,195 | 6/1992 | Christopher | 358/167 |
| 5,130,798 | 7/1992 | Christopher | 358/167 |

FOREIGN PATENT DOCUMENTS 62-299181 12/1987 Japan .

Primary Examiner—James J. Groody
Assistant Examiner—Mark R. Powell
Attorney, Agent, or Firm—Edward W. Goodman

[57] ABSTRACT

In order to obtain the benefits of benefits of field and frame recursive noise reduction while reducing the detriments thereof, a circuit arrangement includes a motion compensated frame recursive noise reduction circuit and a motion compensated field recursive noise reduction circuit. The outputs of these two noise reduction circuits are then combined. The motion compensation vectors for the field and frame recursive noise reduction circuits are determined such that in the case of little or no detected motion, the system is biased toward frame recursive noise reduction to achieve the best resolution on still and slow moving scenes. While in the case of increased motion, the circuit reverts more to field recursive noise reduction to reduce smearing.

16 Claims, 2 Drawing Sheets

METHOD AND APPARATUS FOR COMBINING FIELD AND FRAME RECURSIVE NOISE REDUCTION FOR VIDEO SIGNALS

BACKGROUND OF THE INVENTION

Field of The Invention

The present invention relates to a method and apparatus for reducing noise in video signals.

Description of The Related Art

The problem of reducing the visibility of noise in television displays has been addressed for many years. Various noise reducing circuits are known. A basic approach to solving the noise visibility problem in video displays includes storing a television field or frame, comparing the present or incoming pixel values to the corresponding stored pixel values and adding the two signals together in a ratio determined by the result of the comparison. In the case of high differences between the present and stored values, which is indicative of motion, only the present value is used As the difference decreases, an increasing percentage of the stored value is used.

The best resolution is achieved using recursive noise reduction in which a frame of the video signal is stored and compared pixel-by-pixel with the present video signal. However, any motion occurring in the video signal results in smearing and, as such, in a video signal having moderate amounts of motion, there is no recursive noise reduction. While field recursive noise reduction has substantially less sensitivity to motion as compared to frame recursive noise reduction, resolution of the video signal is compromised in the case of still or slow moving scenes in the video signal.

SUMMARY OF THE INVENTION

It is an object of the present invention to provide a method and apparatus which exhibits the benefits of both field and frame recursive noise reduction while suppressing the detriments thereof.

The above object is achieved in a method and apparatus for combining field and frame recursive noise reduction comprising:

an input for receiving input video signals;

field delay means coupled to said input for delaying said input video signals by the duration of a single field forming field delayed video signals;

frame delay means coupled to said input for delaying said input video signals by the duration of a single frame forming frame delayed video signals;

means coupled to said frame delay means for performing a frame recursive noise reduction on said input video signals, comprising first means for subtracting said input video signals from said frame delayed video signals forming a first difference signal, means coupled to said first subtracting means for providing a portion of said first difference signal in dependence on a first motion vector applied to a control input thereof, and combining means for adding said portion of said first difference signal to said input video signals thereby forming frame recursive noise reduced video signals;

means for determining the first motion vector from said first difference signal at an output of said first subtracting means;

means coupled to said field delay means for performing a field recursive noise reduction on said input video signals, comprising second means for subtracting said input video signals from said field delayed video signals forming a second difference signal, means coupled to said second subtracting means for providing a portion of said second difference signal in dependence on a second motion vector applied to a control input thereof, and means for adding said portion of said second difference signal to said frame recursive noise reduced video signals;

means for determining an intermediate motion vector from said second difference signal at an output of said second subtracting means; and means for determining the second motion vector by combining said intermediate motion vector with said first motion vector.

BRIEF DESCRIPTION OF THE DRAWINGS

With the above and additional objects and advantages in mind as will hereinafter appear, the invention will be described with reference to the accompanying drawings, in which.

DESCRIPTION OF PREFERRED EMBODIMENTS

Figure 1:
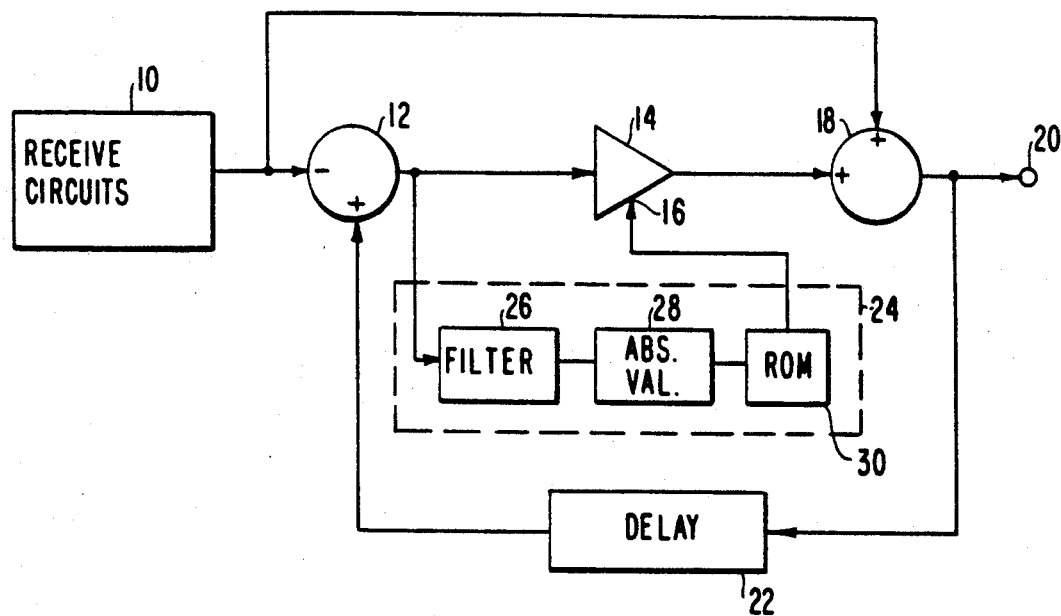
FIG. 1 shows a schematic block diagram of a field or frame recursive noise reduction circuit.

In FIG. 1, a typical recursive noise reduction circuit is shown. After being processed in the receiving circuits 10 of a television receiver, the input video signals are applied to one input of a subtracting circuit 12. The output of the subtracting circuit 12 is applied to a variable gain amplifier 14 having a gain control input 16. The output of the variable gain amplifier 14 is then applied to one input of an adder 18, the input video signals being applied to the other input of the adder 18. The output of the adder 18 is connected to the output 20 of the recursive noise reduction circuit and also to a field (or frame) delay 22. The output of the delay 22 is then connected to the second input of the subtracting circuit 12.

Figure 2:
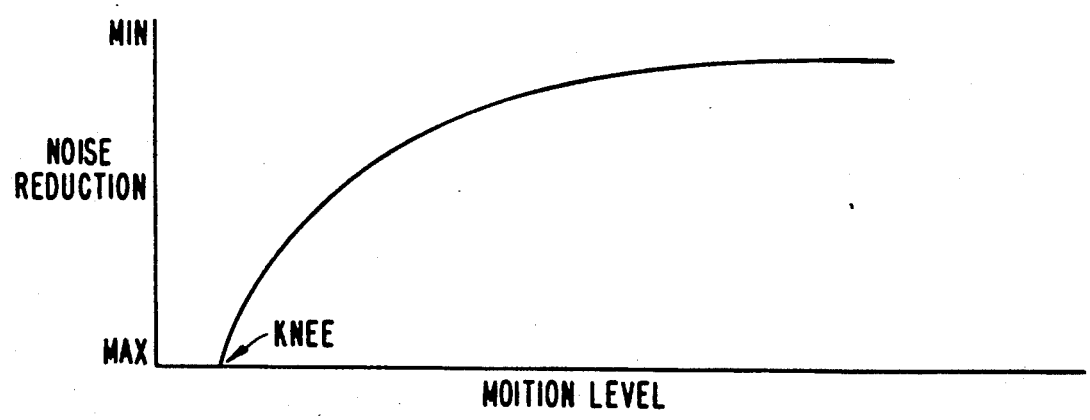
FIG. 2 shows an exemplary noise reduction curve for use in a motion compensation circuit.

The gain control input 16 of the variable gain amplifier 14 is connected to a motion compensation circuit 24 which includes a filter 26 also connected to the output of the subtracting circuit 12. An output of the filter 26 is connected to an absolute value forming circuit 28. The output from the absolute value forming circuit 28 is applied as an address signal to a ROM 30 having stored therein corresponding gain values. FIG. 2 shows an exemplary graph of gain values corresponding to the applied difference values which is stored in the ROM 30. The output of the ROM 30 is then applied to the gain control input 16.

The above recursive noise reduction is suitable for either frame or field noise reduction depending on the delay 22. In operation, the output of the delay 22 is compared with the input video signal in the subtracting circuit 12. The resultant difference value is then applied to the variable gain amplifier 14. The motion compensation circuit 24 then determines a motion vector to be applied to the gain control input 16 of the variable gain amplifier 14 based on the assumption that the greater the difference value, the more motion there is in the video signal. Therefore, less of the difference signal should be added to the input video signal in the adder 18 at the output of the variable gain amplifier 14.

Figure 3:
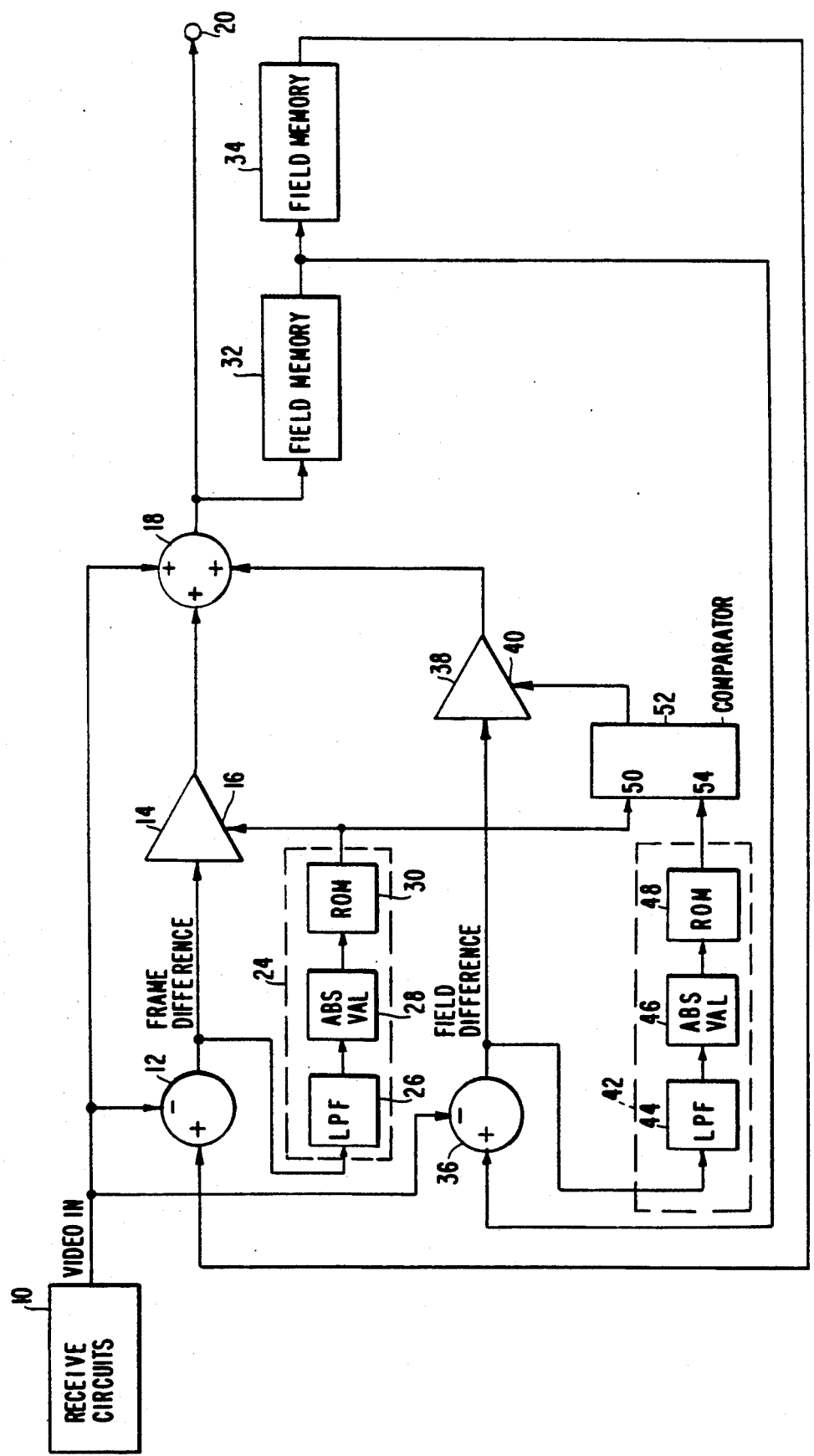
FIG. 3 shows a schematic block diagram of an embodiment of the circuit arrangement of the subject invention.

The circuit arrangement of the subject invention is shown in FIG. 3. The same components as shown in FIG. 1 have the same reference numbers.

The circuit arrangement of the subject invention includes a frame recursive noise reduction circuit as that shown in FIG. 1 and includes subtracting circuit 12, variable gain amplifier 14, adder 18 and motion compensation circuit 24. However, instead of a single delay 22 as shown in FIG. 1, the subject circuit arrangement includes the serial arrangement of two field delay circuits 32 and 34. The output of field delay circuit 34 is then connected to the second input of the subtracting circuit 12.

The circuit arrangement of the subject invention further includes a field recursive noise reduction circuit similar to that shown in FIG. 1. In particular, a second subtracting circuit 36 also has the input video signals applied to one of the inputs thereof The output of the field delay circuit 32 is applied to the second input of the second subtracting circuit 36. The output of the second subtracting circuit 36 is applied to an input of a second variable gain amplifier 38 having a gain control input 40. The output from the variable gain amplifier 38 is applied to a third input of adder 18. A second motion compensation circuit 42 is also connected to the output of the second subtracting circuit 38 and includes a filter 44, an absolute value forming circuit 46 and an ROM 48. The output of the ROM 30 is also applied to a first input 50 of a comparator 52 while the output of the ROM 48 is applied to a second input 54 of the comparator 52. The comparator 52 is arranged such that if the value of the signal at the first input 50 is greater than or equal to the value of the signal at the second input 54, then the comparator 52 output is zero. Otherwise, the comparator 52 output is the difference between the values at the second and first inputs 54 and 50. The output of comparator 52 is then connected to the gain control input 40 of the variable gain amplifier 38.

In operation, the circuit arrangement of the subject invention is biased toward frame recursive noise reduction in the event of still or slow moving scenes in the input video signals. As such, the first motion vector will be larger than the second motion vector resulting in only frame noise reduction. As the motion increases in the scenes, the first motion vector drops to less than the second motion vector resulting in an increasing amount of field recursive noise reduction with a respective drop in frame recursive noise reduction. As motion continues, both field and frame recursive noise reductions are diminished.

Numerous alterations of the structure herein disclosed will suggest themselves to those skilled in the art. However, it is to be understood that the above description is for purposes of illustration only and is not to be construed as a limitation of the invention. All such modifications which do not depart from the spirit of the invention are intended to be included within the scope of the appended claims.

What is claimed is:

1. A method of providing combined field and frame recursive noise reduction for input video signals, said input video signals forming, on display, picture frames including two successive fields of scanning lines, said method comprising the steps:

delaying said input video signals by the duration of a single field forming field delayed video signals;

delaying said input video signals by the duration of a single frame forming frame delayed video signals;

performing a frame recursive noise reduction on said input video signals by subtracting said input video signals from said frame delayed video signals forming a first difference signal and by adding a portion of said difference signal, in dependence on a first motion vector, to said input video signals thereby forming frame recursive noise reduced video signals;

determining said first motion vector from said first difference signal;

performing a field recursive noise reduction on said input video signals by subtracting said input video signals from said field delayed video signals forming a second difference signal and by adding a portion of said second difference signal, in dependence on a second motion vector, to the frame recursive noise reduced video signals; and determining an intermediate motion vector from said second difference signal; and determining said second motion vector by combining said intermediate motion vector with said first motion vector.

2. A method of combining field and frame recursive noise reduction as claimed in claim 1, wherein said step of determining said first motion vector comprises:

filtering said first difference signal and determining an absolute value thereof; and applying the absolute value to a noise reduction curve for determining said first motion vector.

3. A method of combining field and frame recursive noise reduction as claimed in claim 1, wherein said step of determining said intermediate motion vector comprises:

filtering said second difference signal and determining an absolute value thereof; and applying the absolute value to a noise reduction curve for determining said intermediate motion vector.

4. A method of combining field and frame recursive noise reduction as claimed in claim 2, wherein said step of determining said intermediate motion vector comprises:

filtering said second difference signal and determining an absolute value thereof; and applying the absolute value to a noise reduction curve for determining said intermediate motion vector.

5. A method of combining field and frame recursive noise reduction as claimed in claim 1, wherein said step of determining the second motion vector comprises subtracting said first motion vector from said intermediate motion vector thereby forming a resultant difference signal, and setting said second motion vector equal to the resultant difference signal if the resultant difference signal is greater than zero, and setting said second motion vector to zero if the resultant difference signal is less than or equal to zero.

6. A method of combining field and frame recursive noise reduction as claimed in claim 2, wherein said step of determining the second motion vector comprises subtracting said first motion vector from said intermediate motion vector thereby forming a resultant difference signal, and setting said second motion vector equal to the resultant difference signal if the resultant difference signal is greater than zero, and setting said second motion vector to zero if the resultant difference signal is less than or equal to zero.

7. A method of combining field and frame recursive noise reduction as claimed in claim 3, wherein said step of determining the second motion vector comprises subtracting said first motion vector from said intermediate motion vector thereby forming a resultant difference signal, and setting said second motion vector equal to the resultant difference signal if the resultant difference signal is greater than zero, and setting said second motion vector to zero if the resultant difference signal is less than or equal to zero.

8. A method of combining field and frame recursive noise reduction as claimed in claim 4, wherein said step of determining the second motion vector comprises subtracting said first motion vector from said intermediate motion vector thereby forming a resultant difference signal, and setting said second motion vector equal to the resultant difference signal if the resultant difference signal is greater than zero, and setting said second motion vector to zero if the resultant difference signal is less than or equal to zero.

9. An apparatus for combining field and frame recursive noise reduction for input video signals, said input video signals forming, on display, picture frames including two successive fields of scanning lines, said apparatus comprising:
an input for receiving said input video signals;
field delay means coupled to said input for delaying said input video signals by the duration of a single field forming field delayed video signals;
frame delay means coupled to said input for delaying said input video signals by the duration of a single frame forming frame delayed video signals;
means coupled to said frame delay means for performing a frame recursive noise reduction on said input video signals, comprising first means for subtracting said input video signals from said frame delayed video signals forming a first difference signal, means coupled to said first subtracting means for providing a portion of said first difference signal in dependence on a first motion vector applied to a control input thereof, and combining means for adding said portion of said first difference signal to said input video signals thereby forming frame recursive noise reduced video signals;
means for determining the first motion vector from said first difference signal at an output of said first subtracting means;
means coupled to said field delay means for performing a field recursive noise reduction on said input video signals, comprising second means for subtracting said input video signals from said field delayed video signals forming a second difference signal, means coupled to said second subtracting means for providing a portion of said second difference signal in dependence on a second motion vector applied to a control input thereof, and means for adding said portion of said second difference signal to said frame recursive noise reduced video signals;
means for determining an intermediate motion vector from said second difference signal at an output of said second subtracting means; and
means for determining the second motion vector by combining said intermediate motion vector with said first motion vector.

10. An apparatus as claimed in claim 9, wherein said means for determining said first motion vector comprises:
means for filtering said first difference signal and for determining an absolute value thereof; and
means for storing a noise reduction curve having an input for receiving said absolute value of said filtered first difference signal and an output for providing said first motion vector.

11. An apparatus as claimed in claim 9, wherein said means for determining said intermediate motion vector comprises:
means for filtering said second difference signal and for determining an absolute value thereof; and
means for storing a noise reduction curve, having an input for receiving said absolute value of said filtered second difference signal and an output for providing said intermediate motion vector.

12. An apparatus as claimed in claim 10, wherein said means for determining said intermediate motion vector comprises:
means for filtering said second difference signal and for determining an absolute value thereof; and
means for storing a noise reduction curve, having an input for receiving said absolute value of said filtered second difference signal and an output for providing said intermediate motion vector.

13. An apparatus as claimed in claim 9, wherein said means for determining said second motion vector comprises:
means for subtracting said first motion vector from said intermediate motion vector thereby forming a resultant difference signal;
means for setting said second motion vector equal to said resultant difference signal if said resultant difference signal is greater than zero, and for setting said said second motion vector equal to zero if said resultant difference signal is less than or equal to zero.

14. An apparatus as claimed in claim 10, wherein said means for determining said second motion vector comprises:
means for subtracting said first motion vector from said intermediate motion vector thereby forming a resultant difference signal;
means for setting said second motion vector equal to said resultant difference signal if said resultant difference signal is greater than zero, and for setting said said second motion vector equal to zero if said resultant difference signal is less than or equal to zero.

15. An apparatus as claimed in claim 11, wherein said means for determining said second motion vector comprises:
means for subtracting said first motion vector from said intermediate motion vector thereby forming a resultant difference signal;
means for setting said second motion vector equal to said resultant difference signal if said resultant difference signal is greater than zero, and for setting said said second motion vector equal to zero if said resultant difference signal is less than or equal to zero.

16. An apparatus as claimed in claim 12, wherein said means for determining said second motion vector comprises:
means for subtracting said first motion vector from said intermediate motion vector thereby forming a resultant difference signal;
means for setting said second motion vector equal to said resultant difference signal if said resultant difference signal is greater than zero, and for setting said said second motion vector equal to zero if said resultant difference signal is less than or equal to zero.

* * * * *